US008989801B2

(12) United States Patent
Yang

(10) Patent No.: US 8,989,801 B2
(45) Date of Patent: Mar. 24, 2015

(54) MOBILE PHONE AND KEY DETECTION DEVICE

(75) Inventor: Jinhua Yang, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 155 days.

(21) Appl. No.: 13/997,142

(22) PCT Filed: Mar. 2, 2012

(86) PCT No.: PCT/CN2012/071835
§ 371 (c)(1),
(2), (4) Date: Jun. 21, 2013

(87) PCT Pub. No.: WO2012/119525
PCT Pub. Date: Sep. 13, 2012

(65) Prior Publication Data
US 2013/0295985 A1 Nov. 7, 2013

(30) Foreign Application Priority Data
Mar. 4, 2011 (CN) .......................... 2011 1 0052157

(51) Int. Cl.
H04M 1/02 (2006.01)
G06F 3/02 (2006.01)
H04M 1/23 (2006.01)

(52) U.S. Cl.
CPC . H04M 1/02 (2013.01); H04M 1/23 (2013.01); G06F 3/0202 (2013.01); G06F 2203/04104 (2013.01)
USPC ....................................... 455/550.1

(58) Field of Classification Search
CPC ........... H04M 1/02; H04M 1/67; H04M 1/23; H04M 1/677; H04M 1/745; H01L 2924/002; H01L 2924/00; H01L 27/0248; H01L 29/8611
See application file for complete search history.

(56) References Cited

U.S. PATENT DOCUMENTS 5,495,616 A * 2/1996 Henry et al. ................... 710/268
2012/0295669 A1* 11/2012 Zhou ............................ 455/572

FOREIGN PATENT DOCUMENTS

CN 101079637 A 11/2007
CN 101493728 A 7/2009

OTHER PUBLICATIONS

SIPO Office Action, dated Dec. 5, 2012, for CN application 201110052157.5, corresponding to the application currently being filed.

* cited by examiner

Primary Examiner — Bobbak Safaipour
(74) Attorney, Agent, or Firm — Shimokaji IP

(57) ABSTRACT

A mobile phone and a key detection device are disclosed. The mobile phone comprises at least two keys, a baseband chip, a resistor and at least two switch elements. The baseband chip comprises at least two first ports, at least two second ports and an interrupt port. Each first port outputs a first level signal and is correspondingly connected with one end of one key; each second port outputs a second level signal and is correspondingly connected with the other end of the key. One end of the resistor is connected with the interrupt port, and the other end of the resistor is connected with a reference level. One end of each switch element is connected between one first port and the one first port's corresponding key, and the other end of each switch element is connected between the interrupt port and the resistor.

20 Claims, 1 Drawing Sheet

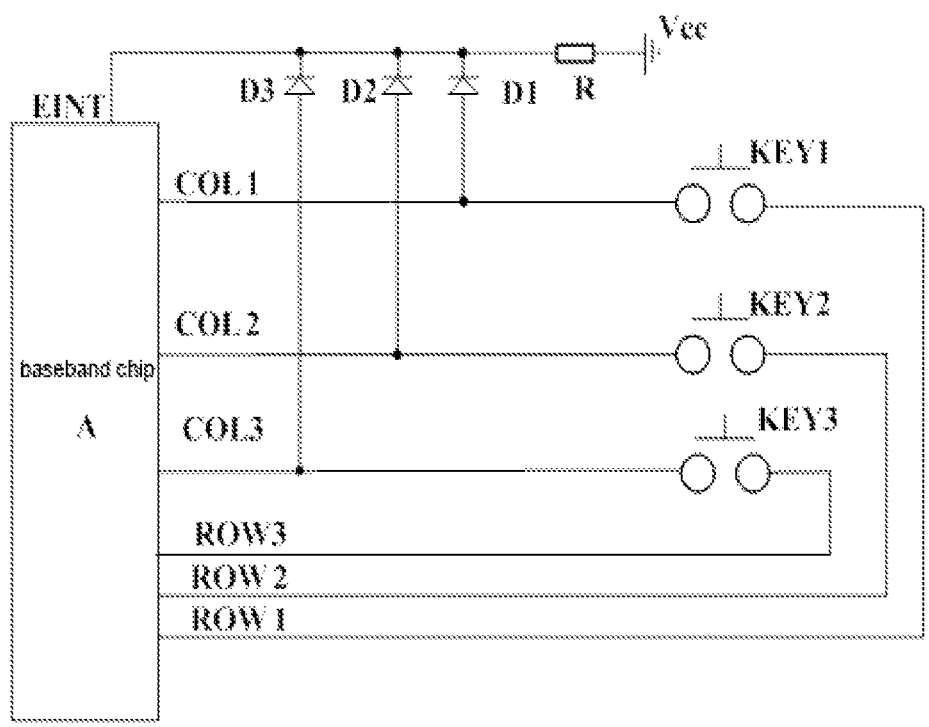

//  MOBILE PHONE AND KEY DETECTION DEVICE

TECHNICAL FIELD

The present invention relates to the mobile communication field, and in particular relates to a mobile phone and a key detection device.

BACKGROUND ART

As communication technology has developed, mobile phones have become an essential part of human lives. Now the technology of mobile phones is developing faster and faster, various applications emerge continuously and the mobile phone has more complete functions. Like a computer, it usually needs two or more keys pressed at the same time to complete a function during use of a mobile phone. For instance, a function is set by pressing down two keys at the same time to lock the keypad or unlock the keypad. The existing baseband chip of a mobile phone, however, does not support the detection when two or more keys are pressed down simultaneously and is unable to implement the application which can only be started by pressing down two or more keys simultaneously.

SUMMARY OF THE INVENTION

The technical issue addressed in the present invention is providing a mobile phone and a key detection device to support the detection when two or more keys in a mobile phone keypad are pressed down simultaneously.

A technical solution employed in the present invention to solve the above mentioned technical issue is: providing a mobile phone. The mobile phone comprises at least two keys, a baseband chip, a resistor and at least two diodes. The baseband chip comprises at least two first ports, at least two second ports and an interrupt port, wherein each first port outputs a first level signal and is correspondingly connected with one end of one key; each second port outputs a second level signal and is correspondingly connected with another end of the key. One end of the resistor is connected with the interrupt port, and the other end of the resistor is connected with a reference level, the interrupt port generates an interrupt when the reference level is received. The anode of each diode is connected between one first port and the corresponding key, and the cathode is connected between the interrupt port and the resistor, wherein the diodes are conducted by the action of both the first level signal and the reference level and cut off by the action of both the second level signal and the reference level.

The first level signal is a high level signal, the second level signal is a low level signal, and the reference level is a ground level.

The first ports are column scanning ports of the baseband chip, and the second ports are row scanning ports of the baseband chip.

Another technical solution employed in the present invention to solve the above mentioned technical issue is: providing a mobile phone. The mobile phone comprises at least two keys, a baseband chip, a resistor and at least two switch elements. The baseband chip comprises at least two first ports, at least two second ports and an interrupt port, wherein each first port outputs a first level signal and is correspondingly connected with one end of one key, and each second port outputs a second level signal and is correspondingly connected with the other end of the key. One end of the resistor is connected with the interrupt port, and the other end of the resistor is connected with a reference level. One end of each switch element is connected between one first port and the corresponding key, and the other end of each switch element is connected between the interrupt port and the resistor, wherein the switch elements are conducted by the action of both the first level signal and the reference level, and are cut off by the action of both the second level signal and the reference level.

The first level signal is a high level signal, the second level signal is a low level signal, and the reference level is a ground level.

The switch elements are diodes, the anode of each diode is connected between one first port and the corresponding key, and the cathode of each diode is connected between the interrupt port and the resistor.

The first ports are the column scanning ports of the baseband chip, and the second ports are the row scanning ports of the baseband chip.

The interrupt port generates an interrupt on the receipt of the reference level.

A further technical solution employed in the present invention to solve the above mentioned technical issue is: providing a key detection device for a mobile phone, the mobile phone comprises at least two keys, and the key detection device comprises a baseband chip, a resistor and at least two switch elements. The baseband chip comprises at least two first ports, at least two second ports and an interrupt port, wherein each first port outputs a first level signal and is correspondingly connected with one end of one key, and each second port outputs a second level signal and is correspondingly connected with the other end of the key. One end of the resistor is connected with the interrupt port, and the other end of the resistor is connected with a reference level. One end of each switch element is connected between one first port and the corresponding key, and the other end of each switch element is connected between the interrupt port and the resistor, wherein the switch elements are conducted by the action of both the first level signal and the reference level and cut off by the action of both the second level signal and the reference level.

The first level signal is a high level signal, the second level signal is a low level signal, and the reference level is a ground level.

The switch elements are diodes, the anode of each diode is connected between one first port and the corresponding key, and the cathode of each diode is connected between the interrupt port and the resistor.

The first ports are the column scanning ports of the baseband chip, and the second ports are the row scanning ports of the baseband chip.

The interrupt port generates an interrupt on the receipt of the reference level.

The beneficial effect of the present invention is that the mobile phone and the key detection device provided by the present invention can support the detection when two or more keys in a mobile phone keypad are pressed down simultaneously, which is different from the existing art.

DESCRIPTION OF THE DRAWINGS

FIG. 1 is a circuit diagram of an embodiment of a mobile phone according to the present invention.

DETAILED DESCRIPTION OF THE INVENTION

FIG. 1 is a circuit diagram of an embodiment of a mobile phone according to the present invention. The mobile phone of the present invention comprises three keys KEY1, KEY2 and KEY3. The key detection device of the mobile phone comprises: a baseband chip A, a resistor R and three switch elements D1, D2 and D3. In the embodiment, the key detection device of the mobile phone generates an interrupt when the three keys KEY1, KEY2 and KEY3 are pressed down at the same time, thus triggering the reservation function of the mobile phone.

In the embodiment, the baseband chip A comprises three first ports COL1, COL2 and COL3, three second ports ROW1, ROW2 and ROW3 as well as one interrupt port EINT. The interrupt port EINT is connected with one end of the resistor R, and the other end of the resistor R is connected with a reference level Vcc. The interrupt port EINT generates an interrupt on the receipt of the reference level Vcc. The first ports COL1, COL2 and COL3 output a first level signal respectively, and the second ports ROW1, ROW2 and ROW3 output a second level signal respectively. In the embodiment, the first ports COL1, COL2 and COL3 are the column scanning ports of the baseband chip A, and the second ports ROW1, ROW2 and ROW3 are the row scanning ports of the baseband chip A; the first level signal is a high level signal, the second level signal is a low level signal and the reference level Vcc is a ground level.

The first port COL1 is connected with one end of the key KEY1, the second port ROW1 is connected with the other end of the key KEY1, when the key KEY1 is pressed down, the first port COL1 shorts out with the second port ROW1, and the level signal at the first port COL1 changes into a low level signal from a high level signal. The first port COL2 is connected with one end of the key KEY2, the second port ROW2 is connected with the other end of the key KEY2, when the key KEY2 is pressed down, the first port COL2 forms a short circuit with the second port ROW2, and the level signal at the first port COL2 changes into a low level signal from a high level signal. The first port COL3 is connected with one end of the key KEY3, the second port ROW3 is connected with the other end of the key KEY3, when the key KEY3 is pressed down, the first port COL3 shorts out with the second port ROW3, and the level signal at the first port COL3 changes into a low level signal from a high level signal.

In the embodiment, switch elements D1, D2 and D3 are diodes. The anode of the switch element D1 is connected between the first port COL1 and the corresponding key KEY1, and the cathode of the switch element D1 is connected between the interrupt port EINT and the resistor R. The anode of the switch element D2 is connected between the first port COL2 and the corresponding key KEY2, and the cathode of the switch element D2 is connected between the interrupt port EINT and the resistor R. The anode of the switch element D3 is connected between the first port COL3 and the corresponding key KEY3, and the cathode of the switch element D3 is connected between the interrupt port EINT and the resistor R. Switch elements D1, D2 and D3 are conducted by the action of both the high level signal (that is the first level signal) and the ground level (that is the reference level Vcc), and are cut off by the action of both the low level signal (that is the second level signal) and the ground level. In other embodiments, switch elements D1, D2 and D3 can be achieved by other elements possessing above mentioned functions.

Referring to FIG. 1, when any one of the three keys KEY1, KEY2 and KEY3 are not pressed down, then the first port COL1, COL2 or COL3 corresponding to the key does not short out with the second port ROW1, ROW2 or ROW3 corresponding to the key; that is, the level signal at the first port COL1, COL2 or COL3 corresponding to the key is a high level signal. Therefore, the switch element D1, D2 or D3 corresponding to the key is conducted by the action of both the high level signal and the ground level, enabling the interrupt port EINT to receive the high level signals output by the first ports COL1, COL2 and COL3. At this time, the interrupt port EINT does not generate an interrupt, the baseband chip A determines that not all the keys EY1, KEY2 and KEY3 are pressed down at the same time, so it will not trigger the reservation function of the mobile phone. When all the three keys KEY1, KEY2 and KEY3 are pressed down at the same time, the three first ports COL1, COL2 and COL3 short out with the three second ports ROW1, ROW2 and ROW3 respectively, the level signals at the first port COL1, COL2 and COL3 change into low level signals from high level signals. Consequently, switch elements D1, D2 and D3 are cut off by the action of the low level signal and the ground level. At this time, the interrupt port EINT is connected with the ground level through the resistor to receive the ground level and thus to generate an interrupt. As the interrupt port EINT has generated interruption, the baseband chip A determines that all the keys KEY1, KEY2 and KEY3 are pressed down at the same time, and then triggers the reservation function of the mobile phone.

What is described above is the introduction for the key detection method when multiple keys are pressed down simultaneously only. The key detection when one key is pressed down alone for the mobile phone of the present invention can be implemented by a traditional key detection system or method, so it will not be repeated here. The mobile phone of the present invention is not limited to implement the detection when three keys are pressed down simultaneously. The number of the keys can be two or more. For instance, the detection when the keys KEY1 and KEY2 are pressed down at the same time can be implemented by cancelling the switch element D3.

The beneficial effect of the present invention is that a mobile phone and a key detection device provided by the present invention are capable of supporting the detection when two or more keys in the keypad are pressed down simultaneously, which is different from the existing art.

The above content are embodiments of the present invention only, with no intent to limit the scope of the invention. All the equivalent structures or equivalent process changes conducted according to the description and the accompanying drawing of the present invention, or directly or indirectly used in other relevant technology fields, should fall into the protection scope of the present invention.

The invention claimed is:

1. A mobile phone, comprising: at least two keys; a baseband chip comprising at least two first ports, at least two second ports and an interrupt port, wherein each of said first ports outputs a first level signal and is correspondingly connected with one end of one of said keys, wherein each of said second ports outputs a second level signal and is correspondingly connected with another end of the one of said keys; a resistor, wherein one end of said resistor is connected with said interrupt port, and another end of the resistor is connected with a reference level, wherein said interrupt port generates an interrupt upon a receipt of said reference level; at least two diodes, wherein an anode of one of said diodes is connected between one of said first ports and the corresponding key of the one of said first ports, and a cathode of the one of said diodes is connected between the interrupt port and the resistor, wherein said diodes are conducted the action of both the first level signal and the reference level, and are cut off by both the second level signal and the reference level.

2. The mobile phone according to claim 1, wherein said first level signal is a high level signal, said second level signal is a low level signal, and said reference level is at ground level.

3. The mobile phone according to claim 2, wherein said first ports are column scanning ports of said baseband chip, and said second ports are row scanning ports of said baseband chip.

4. A mobile phone, comprising: at least two keys; a baseband chip comprising at least two first ports, at least two second ports and an interrupt port, wherein each of said first ports outputs a first level signal and is correspondingly connected with one end of one of said keys, wherein each of said second ports outputs a second level signal and is correspondingly connected with another end of the one of said keys; a resistor, wherein one end of said resistor is connected with said interrupt port, and another end of the resistor is connected with a reference level; at least two switch elements, wherein one end of each of said switch elements is connected between one of said first ports and the corresponding key of the one of said first ports, and another end of the switch element is connected between said interrupt port and said resistor, wherein the switch elements are conducted by the action of both the first level signal and the reference level, and the switch elements are cut off by the action of both the second level signal and the reference level.

5. The mobile phone according to claim 4, wherein said first level signal is a high level signal, said second level signal is a low level signal, and said reference level is a ground level.

6. The mobile phone according to claim 5, wherein said switch elements are diodes, an anode of each said diode is connected between one of said first ports and the corresponding key of the one of said first ports, and a cathode of the diode is connected between the interrupt port and the resistor.

7. The mobile phone according to claim 6, wherein said first ports are column scanning ports for said baseband chip, and said second ports are row scanning ports for said baseband chip.

8. The mobile phone according to claim 4, wherein said interrupt port generates an interrupt upon receipt of the reference level.

9. A key detection device of a mobile phone having at least two keys, comprising: a baseband chip comprising at least two first ports, at least two second ports and an interrupt port; wherein each of said first ports outputs a first level signal and is correspondingly connected with one end of one of said at least two keys, wherein each of said second ports outputs a second level signal and is correspondingly connected with the other end of the one of the at least two keys; a resistor, wherein one end of said resistor is connected with said interrupt port, and another end of the resistor is connected with a reference level; at least two switch elements, wherein one end of each of said switch elements is connected between one of said first ports and the corresponding key for the one of said first ports, and another end of each of the switch elements is connected between said interrupt port and said resistor, wherein said switch elements are conducted by the action of both the first level signal and the reference level, and are cut off by the action of both the second level signal and the reference level.

10. The key detection device according to claim 9, wherein said first level signal is a high level signal, said second level signal is a low level signal, and said reference level is a ground level.

11. The key detection device according to claim 10, wherein said switch elements are diodes, an anode of each said diode is connected between one of said first ports and the corresponding key for the one of said first ports, and a cathode of the diode is connected between the interrupt port and the resistor.

12. The key detection device according to claim 11, wherein said first ports are column scanning ports of the baseband chip, and said second ports are row scanning ports of the baseband chip.

13. The key detection device according to claim 9, wherein said interrupt port generates an interrupt on the receipt of said reference level.

14. The mobile phone according to claim 1, wherein in response to a first key and a second key of the at least two keys being simultaneously pressed, a first one and a second one of the at least two first ports short out with a first one and a second one of the at least two second ports.

15. The mobile phone according to claim 4, wherein in response to a first key and a second key of the at least two keys being simultaneously pressed, a first one and a second one of the at least two first ports short out with a first one and a second one of the at least two second ports.

16. The mobile phone according to claim 4, wherein in response to a first key and a second key of the at least two keys being simultaneously pressed, one of the switch elements is cut off.

17. The mobile phone according to claim 4, wherein the output level from the first port changes from the first level signal to the second level signal in response to one of the at least two keys being pressed.

18. The mobile phone according to claim 9, wherein in response to a first key and a second key of the at least two keys being simultaneously pressed, a first one and a second one of the at least two first ports short out with a first one and a second one of the at least two second ports.

19. The mobile phone according to claim 9, wherein in response to a first key and a second key of the at least two keys being simultaneously pressed, one of the switch elements is cut off.

20. The mobile phone according to claim 9, wherein the output level from the first port changes from the first level signal to the second level signal in response to one of the at least two keys being pressed.

\* \* \* \* \*